US011106810B2

(12) United States Patent
Natanzon et al.

(10) Patent No.: US 11,106,810 B2
(45) Date of Patent: Aug. 31, 2021

(54) MULTI-TENANT DEDUPLICATION WITH NON-TRUSTED STORAGE SYSTEM

(71) Applicant: EMC IP Holding Company LLC, Hopkinton, MA (US)

(72) Inventors: Assaf Natanzon, Tel Aviv (IL); Udi Shemer, Kfar Saba (IL); Zvi Schneider, Tel Aviv (IL); Amitai Alkalay, Kadima (IL)

(73) Assignee: EMC IP Holding Company LLC, Hopkinton, MA (US)

(*) Notice: Subject to any disclaimer, the term of this patent is extended or adjusted under 35 U.S.C. 154(b) by 197 days.

(21) Appl. No.: 16/048,980

(22) Filed: Jul. 30, 2018

(65) Prior Publication Data
US 2020/0034560 A1    Jan. 30, 2020

(51) Int. Cl.
*G06F 21/62* (2013.01)
*G06F 3/06* (2006.01)
*H04L 9/30* (2006.01)
*H04L 29/06* (2006.01)
*H04L 9/08* (2006.01)

(52) U.S. Cl.
CPC .......... *G06F 21/6218* (2013.01); *G06F 3/067* (2013.01); *G06F 3/0608* (2013.01);
(Continued)

(58) Field of Classification Search
CPC .. G06F 21/6218; G06F 3/0608; G06F 3/0641; G06F 3/067; G06F 17/30156;
(Continued)

(56) References Cited

U.S. PATENT DOCUMENTS 7,444,464 B2    10/2008  Urmston et al.
8,095,726 B1     1/2012  O'Connell et al.
(Continued)

FOREIGN PATENT DOCUMENTS

WO    2016111954 A1    7/2016

OTHER PUBLICATIONS pp. 243-258. Yang et al "Zero knowledge based client side deduplication for encrypted files of secure cloud storage in smart cities" Elsevier, Pervasive and Mobile Computing Mar. 5, 2017, http://www.elsevier.com/locate/pmc, pp. 243-258. (Year: 2017).*

(Continued)

*Primary Examiner* — Harunur Rashid
(74) *Attorney, Agent, or Firm* — Ryan, Mason & Lewis, LLP

(57) ABSTRACT

An apparatus, in one example, comprises a storage system configured to perform one or more deduplication operations on encrypted datasets received for a plurality of tenants and store at least a portion of the encrypted datasets, the datasets having been encrypted for respective ones of the plurality of tenants using a common encryption key. The apparatus further comprises a cryptographic module associated with the storage system, the cryptographic module configured to, in response to a request to access an encrypted dataset stored by the storage system corresponding to a given one of the plurality of tenants, further encrypt the encrypted dataset using a tenant encryption key associated with the given one of the plurality of tenants. The storage system is further configured to send the further encrypted dataset to the given one of the plurality of tenants that requested access.

20 Claims, 6 Drawing Sheets

(52) U.S. Cl.
CPC ............ *G06F 3/0641* (2013.01); *H04L 9/083* (2013.01); *H04L 9/302* (2013.01); *H04L 63/0442* (2013.01)

(58) Field of Classification Search
CPC ......... G06F 17/30112; G06F 17/30106; H04L 9/302; H04L 63/0442; H04L 9/083; H04L 9/0618; H04L 63/0435; H04L 63/061
See application file for complete search history.

(56) References Cited

U.S. PATENT DOCUMENTS

| | | | |
|---|---|---|---|
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,606,870 | B1 | 3/2017 | Meiri et al. |
| 9,716,754 | B2 | 7/2017 | Swift |
| 9,779,269 | B1 * | 10/2017 | Perlman ............... H04L 9/0822 |
| 10,783,269 | B1 * | 9/2020 | Shraer ................. G06F 21/6227 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0325824 | A1 | 12/2013 | Shoens |
| 2014/0181016 | A1 | 6/2014 | Whitehead et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |
| 2017/0193032 | A1 * | 7/2017 | Kim ...................... H04L 9/0861 |
| 2017/0346625 | A1 * | 11/2017 | Yan ..................... B29C 45/5008 |
| 2019/0087432 | A1 * | 3/2019 | Sion ........................ G06F 21/62 |
| 2019/0155919 | A1 * | 5/2019 | Kaul ........................ H04L 69/22 |

OTHER PUBLICATIONS

Rashid et al., "A secure data deduplication framework for cloud environments" Published in: 2012 Tenth Annual International Conference on Privacy, Security and Trust; Publisher: IEEE; Date Added to IEEE Xplore: Sep. 13, 2012, pp. 81-87 (Year: 2012).*
Li et al., "Secure Deduplication with Efficient and Reliable Convergent Key Management" IEEE Transactions On Parallel and Distributed Systems, vol. 25, No. 6, Jun. 2014, p. 1615-1625 (Year: 2014).*
EMC Corporation, "Introduction to the EMC XtremIO Storage Array (Ver. 4.0): A Detailed Review," White Paper, Apr. 2015, 65 pages.
EMC Corporation, "Unstoppable Data Reduction: Always-on, In-Line, Zero-Penalty, Enterprise-Class, Free" https://store.emc.com/xtremio, Jul. 2014, 2 pages.
EMC Corporation, "Introduction to XtremIO Virtual Copies," White Paper, Mar. 2016, 39 pages.
EMC Corporation, "XtremIO Data Production (XDP): Flash-Specific Data Protection, Provided by XtremIO (Ver. 4.0)," White Paper, Apr. 2015, 25 pages.
Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
EMC Corporation, "High Availability, Data Protection and Data Integrity in the XtremIO Architecture," White Paper, Apr. 2015, 28 pages.
Y. Zhang et al., "End-to-End Integrity for File Systems: A ZFS Case Study," Proceedings of the 8th USENIX Conference on File and Storage Technologies (FAST), Feb. 23-26, 2010, 14 pages.
Dell EMC, "Introduction to Dell EMC XtremIO X2 Storage Array—A Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
Dell EMC, "Introduction to Dell EMC XtremIO X2 Storage Array—A Detailed Review," Dell EMC White Paper, Apr. 2018, 52 pages.
Dell EMC, "Introduction to XtremIO Metadata-Aware Replication," Dell EMC White Paper, Apr. 2018, 18 pages.

* cited by examiner

US 11,106,810 B2

MULTI-TENANT DEDUPLICATION WITH NON-TRUSTED STORAGE SYSTEM

FIELD

The field relates generally to information processing systems, and more particularly to storage in information processing systems.

BACKGROUND

In many information processing systems, it is desirable to implement deduplication functionality in order to ensure that the same data is not repeatedly stored in a duplicative manner that consumes excessive storage capacity. However, conventional approaches to deduplication can be problematic particularly for information processing systems that host multiple tenants while utilizing non-trusted storage.

SUMMARY

Embodiments provide techniques for deduplication in a multi-tenant storage system.

In one embodiment, an apparatus comprises a storage system configured to perform one or more deduplication operations on encrypted datasets received for a plurality of tenants and store at least a portion of the encrypted datasets, the datasets having been encrypted for respective ones of the plurality of tenants using a common encryption key. The apparatus further comprises a cryptographic module associated with the storage system. The cryptographic module is configured to, in response to a request to access an encrypted dataset stored by the storage system corresponding to a given one of the plurality of tenants, further encrypt the encrypted dataset using a tenant encryption key associated with the given one of the plurality of tenants. The storage system is configured to send the further encrypted dataset to the given one of the plurality of tenants that requested access.

In another embodiment, a method associated with a storage system comprises performing one or more deduplication operations on encrypted datasets received for a plurality of tenants in the storage system, the datasets having been encrypted for respective ones of the plurality of tenants using a common encryption key. At least a portion of the encrypted datasets are stored in the storage system. In response to a request to access an encrypted dataset stored by the storage system corresponding to a given one of the plurality of tenants, the method further encrypts the encrypted dataset using a tenant encryption key associated with the given one of the plurality of tenants. The further encrypted dataset is sent from the storage system to the given one of the plurality of tenants that requested access.

In a further embodiment, a method associated with a given tenant comprises encrypting a dataset associated with the given tenant of a plurality of tenants using an encryption key common to the plurality of tenants. The method sends the encrypted dataset to a storage system configured to perform one or more deduplication operations on encrypted datasets received for the plurality of tenants and store at least a portion of the encrypted datasets. Still further, the method sends a request to access the encrypted dataset stored by the storage system corresponding to the given tenant, and receives the encrypted dataset from the storage system, the encrypted dataset having been further encrypted by the storage system using a tenant encryption key associated with the given tenant. The further encrypted dataset is then decrypted using a corresponding tenant decryption key to obtain the dataset.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
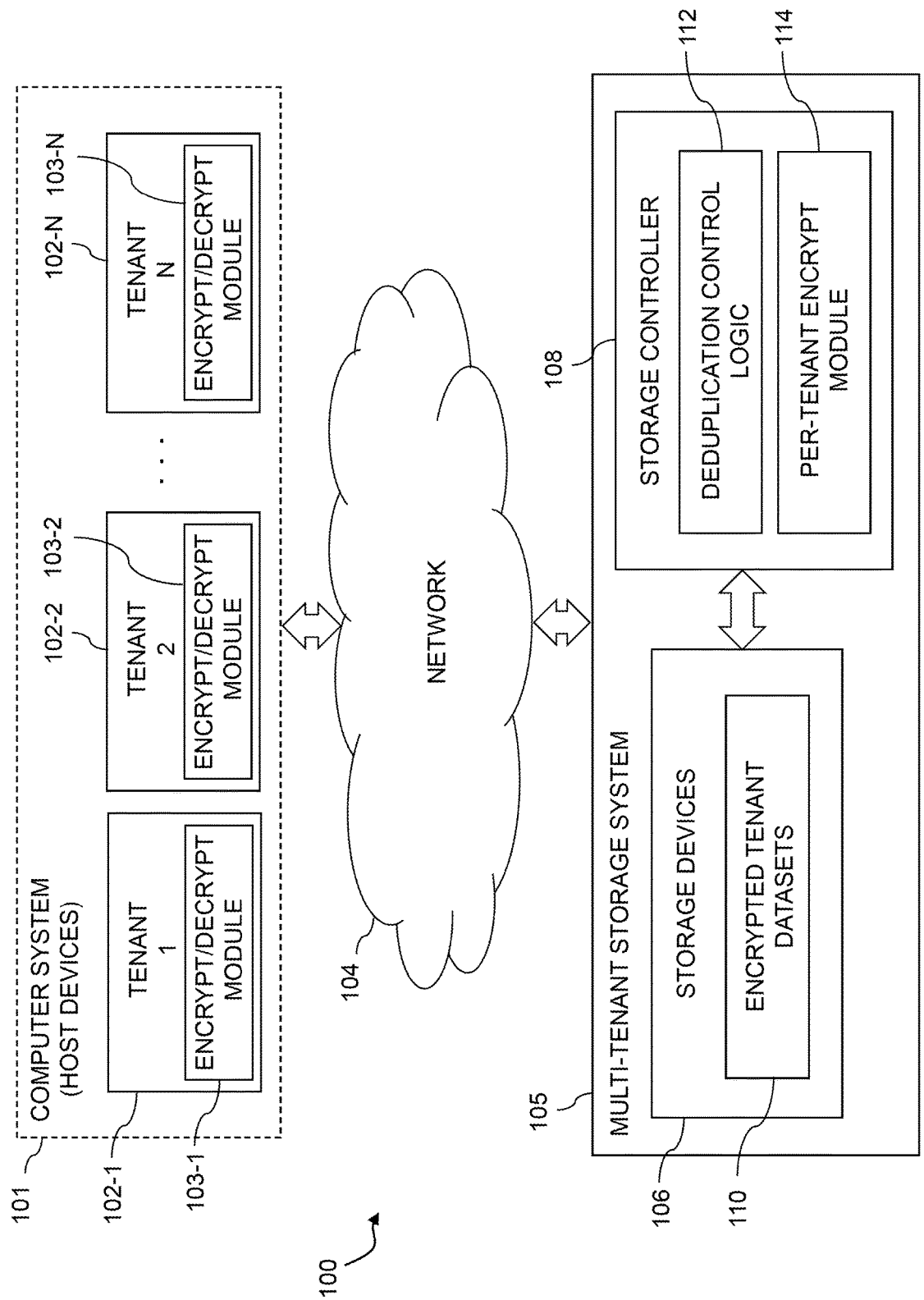
FIG. 1 is a block diagram of an information processing system in a multi-tenant environment with functionality for performing multi-tenant deduplication for datasets in a non-trusted storage system, according to an illustrative embodiment.

FIG. 1 shows an information processing system 100 configured in accordance with an illustrative embodiment. The information processing system 100 comprises a computer system 101 wherein a plurality of tenants 102-1, 102-2, . . . 102-N are hosted. The computer system 101 communicates over a network 104 with a multi-tenant storage system 105.

Note that for ease of description, tenants 102-1, 102-2, . . . 102-N are sometimes collectively referred to herein as "tenants 102" and other times individually as "tenant 102" depending on whether they are being referenced as a group or individually. The term "tenant" as illustratively used herein refers to one or more users of the functionalities of the information processing system 100.

The term "user" herein is intended to be broadly construed so as to encompass numerous arrangements of human, hardware, software or firmware entities, as well as combinations of such entities. In one example, a tenant is an application program running on one or more host devices of computer system 101. For example, the application program is configured to generate or otherwise access data that is to be stored in multi-tenant storage system 105 (hereinafter more simply referred to as "storage system 105") and subsequently accessed during the execution of the application program. Thus, "multi-tenancy" with regard to computer system 101 means that the computer system 101 hosts a plurality of tenants. In some embodiments, each tenant is hosted by its own host device. In other embodiments, more than one tenant can be hosted on a host device or one tenant may be hosted by multiple host devices. Thus, in illustrative embodiments, when the term "tenant" is used, it is to be understood to also comprise the one or more host devices upon which the application program is executed.

The computer system 101 including its tenants 102 is assumed to comprise an enterprise computer system, cloud-based computer system or other arrangement of multiple compute nodes associated with respective users. Further, the tenants 102 and the storage system 105 illustratively comprise respective processing devices of one or more processing platforms. For example, the tenants 102 and the storage system 105 can each comprise one or more processing devices each having a processor and a memory, possibly implementing virtual machines and/or containers, although numerous other configurations are possible.

The tenants 102 and the storage system 105 can additionally or alternatively be part of cloud infrastructure such as an Amazon Web Services (AWS) system. Other examples of cloud-based systems that can be used to provide computer system 101 and storage system 105 include Google Cloud Platform (GCP) and Microsoft Azure.

The tenants 102 are each configured to write data to and read data from the storage system 105. The tenants 102 and the storage systems 105 may be implemented on a common processing platform, or on separate processing platforms. A wide variety of other types of host devices associated with the tenants 102 can be used in other embodiments.

Compute and/or storage services may be provided for tenants 102 under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the tenants 102 of the computer system 101 over the network 104. The storage system 105 comprises a plurality of storage devices 106 and an associated storage controller 108.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

As further shown in FIG. 1, each tenant 102 includes encrypt/decrypt module 103, i.e., modules 103-1, 103-2, . . . 103-N. Note that for ease of description, modules 103-1, 103-2, . . . 103-N are sometimes collectively referred to herein as "modules 103" and other times individually as "module 103" depending on whether they are being referenced as a group or individually. Module 103 provides logic and functionality for encrypting data that is to be written to the storage system 105 and decrypting data that is read from storage system 105. Further details of the logic and functionality of modules 103 will be described herein in the context of FIGS. 2A, 2B, and 3. Encrypt/decrypt modules 103 are more generally referred to as cryptographic modules. The term "cryptographic module" as broadly used herein should be understood to encompass cryptographic functionalities such as those relating to encryption and/or decryption of datasets using cryptographic keys as well as obtaining such keys. Thus, in some embodiments, a particular cryptographic module performs encryption and decryption, while in other embodiments, a particular cryptographic module performs only encryption or only decryption. The computer system 101 and tenants 102 should also be understood to include additional modules and other components typically found in conventional implementations of computers, servers or other host devices, although such additional modules and other components are omitted from the figure for clarity and simplicity of illustration.

By way of example only, in some embodiments, each tenant 102 also includes data compression control logic that is configured to compress data before it is sent to the storage system 105 for storage. The compression logic can be considered implemented in module 103 in FIG. 1, or alternatively in a separate module. In embodiments that implement compression, the tenant datasets remain compressed while stored in the storage devices 106 of the storage system 105. The compression algorithm, in illustrative embodiments, is the same for each tenant. The compression algorithm can be any suitable conventional data compression algorithm. Data compress/decompress and data deduplication are more generally referred to as "data reduction" processes.

Still further, as shown in the storage system 105, the storage controller 108 includes deduplication control logic 112 and a per-tenant encrypt module 114. While shown as separate components in FIG. 1, in some embodiments, the functionalities of logic 112 and module 114 are combined into a single module or logic within the storage controller 108.

Deduplication control logic 112 provides functionalities for deduplicating data sent from the tenants 102 for storage on storage devices 106. Deduplication refers to a data processing technique for eliminating redundant datasets in a plurality of datasets. In the process of deduplication, extra copies of the same data are deleted, leaving only one copy to be stored. Deduplication control logic 112 can be configured to implement one or more different types of conventional data deduplication algorithms. In one embodiment, as shown in FIG. 1, the data received from tenants 102 is represented as encrypted datasets 110 stored in storage devices 106. Thus, deduplication control module 112 performs one or more deduplication operations on the encrypted tenant datasets 110. In some embodiments, deduplication is performed in the context of a content addressable storage environment. One illustrative embodiment of a content addressable storage environment is described below in the context of FIG. 4.

Per-tenant encrypt module 114 provides functionalities for encrypting data associated with a given one of the tenants 102 using an encryption algorithm (e.g., key) that is dedicated to the given tenant. That is, per-tenant encrypt module 114 uses a different encryption algorithm for each tenant 102. Further details of the functionalities of module 114 will be described below in the context of FIGS. 2A, 2B, and 3. Per-tenant encrypt module 114 is more generally referred to as a cryptographic module.

The storage system 105 should also be understood to include additional modules and other components typically found in conventional implementations of computers, servers or other host devices, although such additional modules and other components are omitted from the figure for clarity and simplicity of illustration.

The tenants 102 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources. Further, the tenants 102 and the storage system 105 may be implemented on respective distinct processing platforms, although numerous other arrangements are possible.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the tenants 102 and storage system 105 to reside in different data centers. Numerous other distributed implementations of one or both of the tenants 102 and the storage system 105 are possible. Accordingly, the storage system 105 can also be implemented in a distributed manner across multiple data centers.

Additional examples of processing platforms utilized to implement tenants and/or storage systems in illustrative embodiments will be described in more detail below in the context of FIGS. 5 and 6.

It is to be appreciated that these and other features of illustrative embodiments are presented by way of example only and should not be construed as limiting in any way.

Accordingly, different numbers, types and arrangements of system components such as tenants 102, network 104, storage system 105, storage devices 106, and storage controller 108 can be used in other embodiments. By way of example only, in some embodiments, an information processing system includes multiple storage systems configured in the manner described herein for storage system 105. In such embodiments, one or more of tenants 102 use different ones of the multiple storage systems to write/read datasets.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality, logic and configurations.

Given the illustrative description of information processing system 100 in FIG. 1 above, illustrative embodiments providing multi-tenant deduplication for datasets in a non-trusted storage system will now be described. It is assumed, for example, that storage system 105 is non-trusted such as is typically the case for data storage in a public cloud platform. By "non-trusted" it is generally meant that there are one or more reasons that a given tenant 102 does not want to store its dataset(s) on storage system 105 in an unprotected manner. By way of example only, one reason is that since storage system 105 is a multi-tenant environment, a first tenant does not want a second tenant to accidentally or maliciously obtain the first tenant's data. Another reason is that a tenant does not want a cloud provider to accidentally or maliciously obtain the tenant's data.

One way to protect the datasets of tenants 102 would be to encrypt their datasets. However, if each tenant 102 encrypts the same dataset with different encryption keys, then storage system 105 will not be able to deduplicate the datasets amongst the tenants. For example, if a dataset from a first tenant is identical to a dataset of a second tenant and would otherwise be deduplicated, by encrypting each dataset with a different encryption key, the storage system 105 would view the two datasets as different and therefore not deduplicate them.

However, as mentioned above, since there is typically no trust in a public cloud storage system, tenants do not want other cloud users and/or cloud providers to be able to access their data and therefore their data must be encrypted before sending it to the storage system 105. If the tenants were to use a common encryption algorithm and share an encryption key, with no other cryptographic safeguards, one tenant would be able to encrypt and decrypt data of another tenant (assuming it had the decryption key corresponding to the common encryption key).

Illustrative embodiments overcome these and other drawbacks by providing cryptographic techniques in the context of an information processing system, such as system 100, that enable multi-tenant deduplication for datasets in a non-trusted storage environment. More particularly, as will be described in detail below, illustrative embodiments allow deduplication in a target storage system, without the storage system being able to access the data, and use a different data decryption key for each tenant. Among many advantages, one advantage is that if there is a malicious tenant, which is blocked from storage after the deletion of the tenant's key, the malicious tenant will not be able to access the data unless given a new key.

FIGS. 2A and 2B are flow diagrams of a process for performing multi-tenant deduplication for datasets in a non-trusted storage system, according to an illustrative embodiment. More particularly, FIG. 2A illustrates steps 200 from the perspective of a storage system 105, while FIG. 2B illustrates steps 220 from the perspective of a given tenant 102. It is to be appreciated, however, that the steps of the processes of FIGS. 2A and 2B can be implemented in information processing systems other than the one shown in FIG. 1 in alternative embodiments.

Thus, as shown in step 202 of FIG. 2A, storage system 105 performs one or more deduplication operations on encrypted datasets received for a plurality of tenants in the storage system. In some embodiments, the encrypted datasets are sent as part of write requests. Deduplication is performed by deduplication control logic 112. Note that it is understood that each dataset has been previously encrypted by each tenant using the encrypt portion of module 103 using a common encryption key shared among the tenants before sending its dataset to the storage system 105. The storage system 105 (because it is assumed to be non-trusted) does not have the decryption key corresponding to the common encryption key and can therefore not access the original datasets. Further, in illustrative embodiments, the individual tenants 102 also do not have the key to directly decrypt the dataset encrypted with the common encryption key.

However, because a common encryption operation is used by all tenants, the storage system 105 will view identical (plain text or original) datasets encrypted by different tenants as duplicative, and thus delete all but one of the identical encrypted datasets. Following such deduplication, in step 204, at least a portion of the encrypted datasets received are stored in the storage devices 106 of storage system 105. The term "at least a portion of the encrypted datasets received" is used in this context since some received encrypted datasets are not stored if it is determined by deduplication control logic 112 that a duplicate is already stored.

Then, in response to a request to access an encrypted dataset stored by the storage system 105 corresponding to a given tenant 102 (e.g., a read request), step 206 further encrypts the encrypted dataset using a tenant encryption key associated with the given tenant. This tenant encryption key is a dedicated per-tenant key meaning that the storage system 105 maintains separate encryption keys for each tenant. The per-tenant encryption keys are obtained and used to further encrypt the encrypted datasets by per-tenant encrypt module 114. The term "further encrypts" means that an additional encryption operation is performed on the already-encrypted dataset. An exemplary cryptographic protocol that implements these encryption operations (and corresponding decryption operations) will be explained below in the context of FIG. 3. In step 208, the storage system 105 sends the further encrypted dataset to the given tenant that issued the read request.

FIG. 2B illustrates the protocol from the perspective of a given tenant 102. As mentioned above, module 103 of a given tenant 102 encrypts a dataset using the encryption key common to the plurality of tenants in step 222, and then sends the encrypted dataset (e.g., as part of a write request) to the storage system 105 in step 224. Subsequently, when the given tenant 102 seeks to access the dataset (e.g., as part of a read request), the given tenant 102 sends a request to the storage system 105 in step 226. In step 227, the encrypted dataset is received from the storage system 105 but recall that the encrypted dataset has been further encrypted by the storage system 105 as explained above using a tenant encryption key associated with the given tenant (i.e., per-tenant encryption key). The given tenant 102 has the corresponding tenant decryption key to decrypt the further encrypted dataset and obtain the original/plain text dataset in step 228.

The particular processing operations and other system functionality described in conjunction with the flow diagrams of FIGS. 2A and 2B are presented by way of illustrative example only, and should not be construed as limiting the scope of the disclosure in any way. Alternative embodiments can use other types of processing operations for performing deduplication and encryption/decryption. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different deduplication and encryption/decryption processes for respective different datasets or for different storage systems or portions thereof within a given information processing system.

Functionality such as that described in conjunction with the flow diagrams of FIGS. 2A and 2B can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
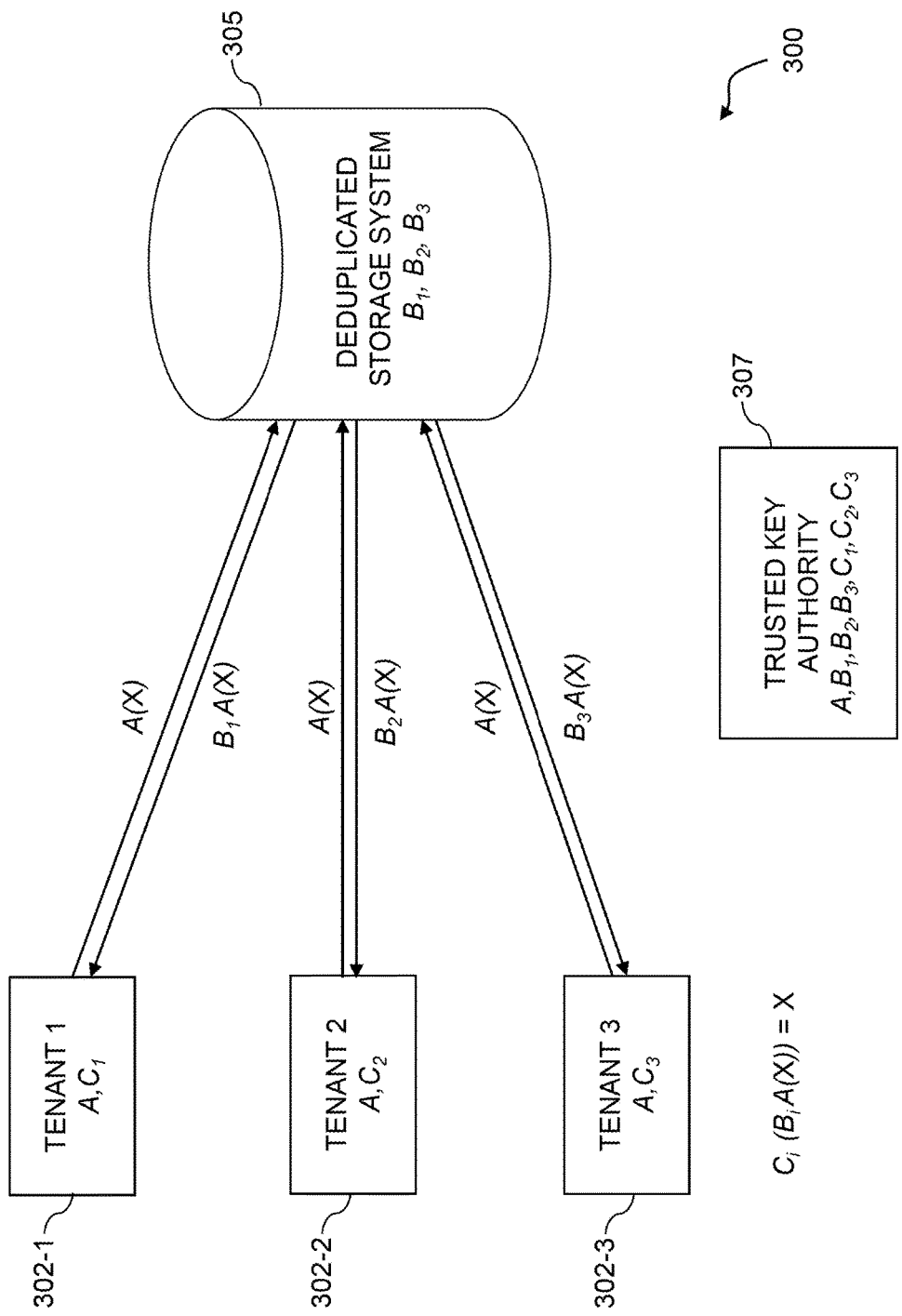
FIG. 3 is a block diagram illustrating a cryptographic protocol used in an information processing system in a multi-tenant environment with functionality for performing multi-tenant deduplication for datasets in a non-trusted storage system, according to an illustrative embodiment.

FIG. 3 illustrates a cryptographic protocol 300 used in an information processing system with functionality for performing multi-tenant deduplication for datasets in a non-trusted storage system, according to an illustrative embodiment. As shown, the system 300 includes three tenants 302-1, 302-2, and 302-3. Note that for ease of description, tenants 302-1, 302-2, and 302-3 are sometimes collectively referred to herein as "tenants 302" and other times individually as "tenant 302" depending on whether they are being referenced as a group or individually. These tenants correspond to tenants 102 in FIG. 1, and three are shown for illustrative purposes only.

Tenants 302 store datasets on deduplicated storage system 305. Storage system 305 corresponds to storage system 105 in FIG. 1. Trusted key authority 307 is a trusted key management entity operatively coupled to the tenants 302 and storage system 305 and configured to securely generate/update and provide the cryptographic keys used in the encryption/decryption operations described herein.

As shown, in this example, each tenant 302 uses the same encryption scheme A to encrypt dataset (plain text) X. As such, in this example, the storage system 305 receives the same encrypted dataset A(X) from all tenants. As mentioned above, since it is assumed that storage system 305 is non-trusted, the decryption scheme of A is maintained as a secret so that no one having the encryption key of encryption scheme A will be able to read the data from the storage system 305. Thus, illustrative embodiments provide, for every tenant i (i=1, 2, 3 in this simple example), an encryption algorithm $B_i$ on the storage system 305 such that when data is requested by a read request for tenant i, the storage system 305 encrypts the data stored (A(X)) with the $B_i$ algorithm. Thus, if the plain text data is X, each tenant 302 receives $B_i(A(x))$. For example, in the case of tenant 302-1, the storage system 305 sends $B_1A(X)$ to tenant 302-1.

Further, each tenant 302 is configured with algorithm $C_i$ such that $C_iB_i(A(X))=X$, and thus is able to decrypt the data received from storage system 305 to obtain X. For example, in the case of tenant 302-1, tenant 302-1 performs $C_1(B_1A(X))$ to obtain X.

Without algorithm $C_i$, the tenant 302 cannot read the data as there is no way to decrypt the data even if the tenant had direct access to the storage system 305. As mentioned above, the various keys of the cryptographic algorithms described herein are managed and provided by trusted key authority 307.

In one illustrative embodiment, cryptographic protocol 300 is implemented with a Rivest-Shamir-Adleman (RSA) based cryptographic algorithm as follows:

In RSA, the public key is A,n when n=pq is a multiple of two prime numbers.

The private key is B where $A*B=1$ mod n

The encryption is $X=M^A$ mod n and the decryption is $X^B$ mod n

The trusted key authority 307 creates n=pq and a public key A, and for each tenant 302, the trusted key authority 307 creates a storage private key $B_i$ and a client private key $C_i$ Such that $A*B_i*C_i=1$ mod n.

The write scheme of all the tenants 302 is: $X=M^A$ mod n.

When a given tenant 302 tries to read data from the storage system 305, the storage system 305 returns $Y=X^{B_i}$ mod n. When the data reaches the tenant 302, the tenant 302 decrypts the data in the following way $M=Y^{C_i}$ mod n.

It is to be understood that the above-described RSA based embodiment is one example of a cryptographic protocol that can be used to perform the functionalities described herein.

Functionality such as that described in conjunction with the protocol of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device hosting a given tenant or a storage controller associated with a storage system can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host device or the storage controller, as well as other system components, may be implemented at least in part using processing devices of such processing platforms. For example, in a distributed implementation of the storage controller, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate multi-tenant deduplication and cryptographic techniques as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of the storage system 105, and accordingly is assumed to be coupled to tenants 102 of computer system 101 via network 104 within information processing system 100.

Figure 2:
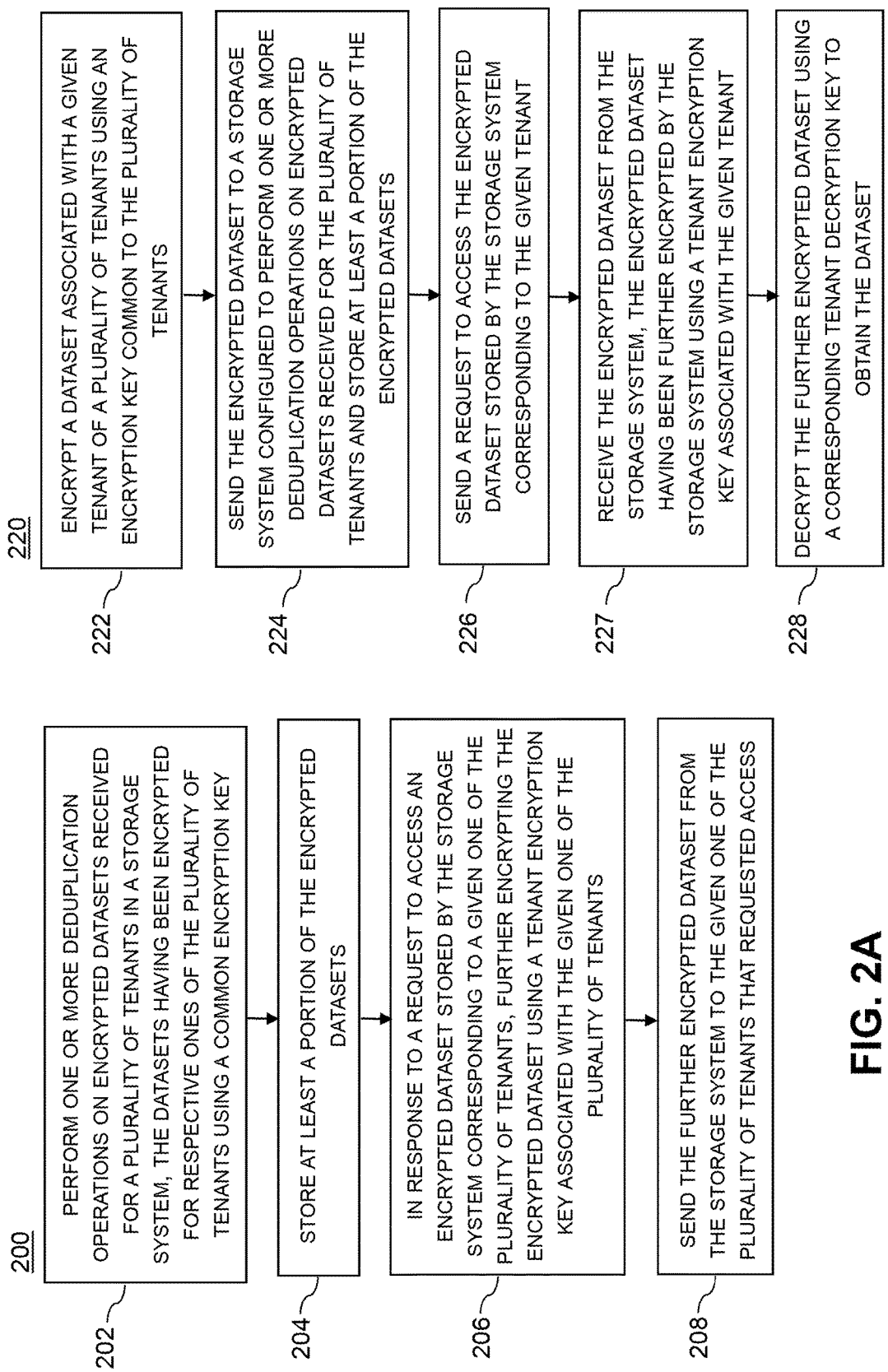
FIGS. 2A and 2B are flow diagrams of processes for performing multi-tenant deduplication for datasets in a non-trusted storage system, according to an illustrative embodiment.

The storage controller 408 in the present embodiment is configured to implement multi-tenant deduplication and cryptographic functionality of the type previously described in conjunction with FIGS. 1 through 3.

The storage controller 408 includes distributed modules 412 and 414, which are configured to operate in a manner similar to that described above for respective corresponding modules 112, and 114.

Figure 4:
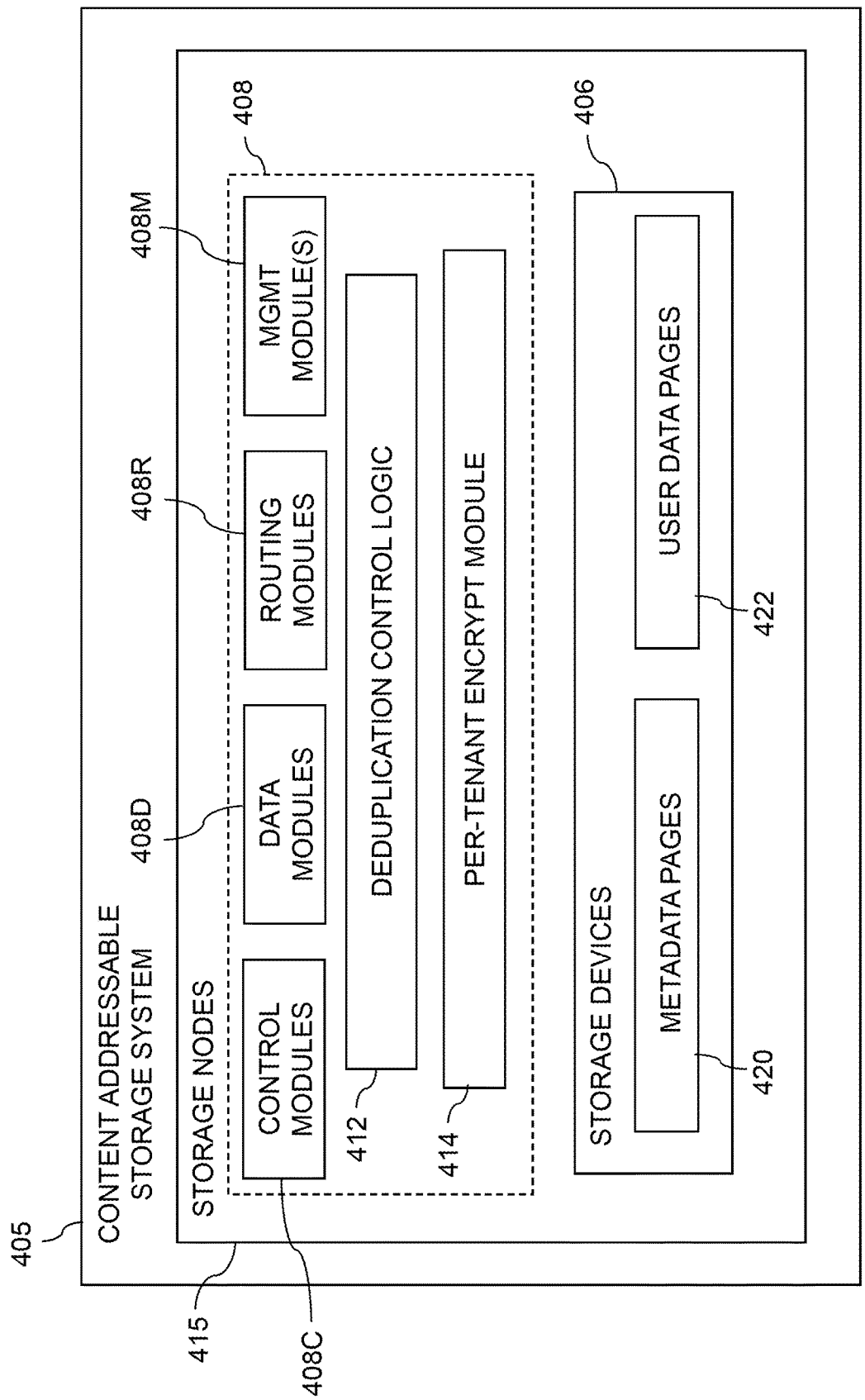
FIG. 4 is a block diagram of a content addressable storage system having a distributed storage controller configured with functionality for performing multi-tenant deduplication for datasets in a non-trusted storage environment, according to an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Other clustered storage system arrangements comprising multiple storage nodes can be used in other embodiments. A given clustered storage system may include not only storage nodes 415 but also additional storage nodes coupled to network 204. Alternatively, such additional storage nodes may be part of another clustered storage system. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP and Transmission Control Protocol (TCP). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408. Accordingly, at least portions of the deduplication and cryptographic functionalities of the modules 412 and 414 may be implemented in one or more of the other modules of the storage controller 408. In other embodiments, the modules 412 and 414 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "dataset," on behalf of tenants 102. Each such LUN may comprise particular ones of the above-noted pages of the user data area. The user data stored in the user data pages 422 can include any type of user data that may be utilized in the system 100. The term "user data" herein is therefore also intended to be broadly construed.

A given dataset for which deduplication and cryptographic operations are performed using modules 412 and 414 illustratively comprises a set of LUNs, each including multiple ones of the user data pages 422 stored in storage devices 406. Note, however, that user data pages 422 are encrypted by tenants prior to being sent to content addressable storage system 405 for the reasons described above in the context of FIGS. 1 through 3. Thus, it is understood that references to user data pages 422 in the FIG. 4 embodiment means "encrypted user data pages."

The content addressable storage system 405 in the embodiment of FIG. 4 is configured to generate hash metadata providing a mapping between content-based digests of respective ones of the user data pages 422 and corresponding physical locations of those pages in the user data area. Content-based digests generating using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The deduplication and cryptographic functionalities provided by modules 412 and 414 in this embodiment are assumed to be distributed across multiple distributed processing modules, including at least a subset of the processing modules 408C, 408D, 408R and 408M of the distributed storage controller 408.

For example, the management module 408M of the storage controller 408 may include deduplication control logic that engages corresponding deduplication control logic instances in all of the control modules 408C and routing modules 408R in order to implement a deduplication process. A similarly managed and distributed encryption process is implemented in some embodiments.

In some embodiments, the content addressable storage system 405 comprises an XtremIO™ storage array suitably modified to incorporate techniques as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, deduplication and cryptographic functionalities in some embodiments are implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one dataset of the storage system 405 be written to in a particular manner. A given write request is illustratively received in the storage system 405 from a host device, illustratively one of the tenants 102. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one dataset of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 405.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 406. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement deduplication and cryptographic functionalities in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of host devices or storage systems with deduplication and cryptographic functionalities as disclosed herein can provide a number of significant advantages relative to conventional arrangements.

Functionalities for deduplication and cryptographic operations and associated automated processing can be implemented in a host device, in a storage system, or partially in a host device and partially in a storage system.

These and other embodiments can considerably reduce the amounts of computational and memory resources that are required to perform deduplication and cryptographic functionalities, thereby leading to improved deduplication and associated improvements in system performance and system security.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices (tenants) and storage systems with deduplication and cryptographic functionalities will now be described in greater detail with reference to FIGS. 5 and 6. Although described in the context of system 100, these platforms may also be used to implement at least portions of other information processing systems in other embodiments.

Figure 5:
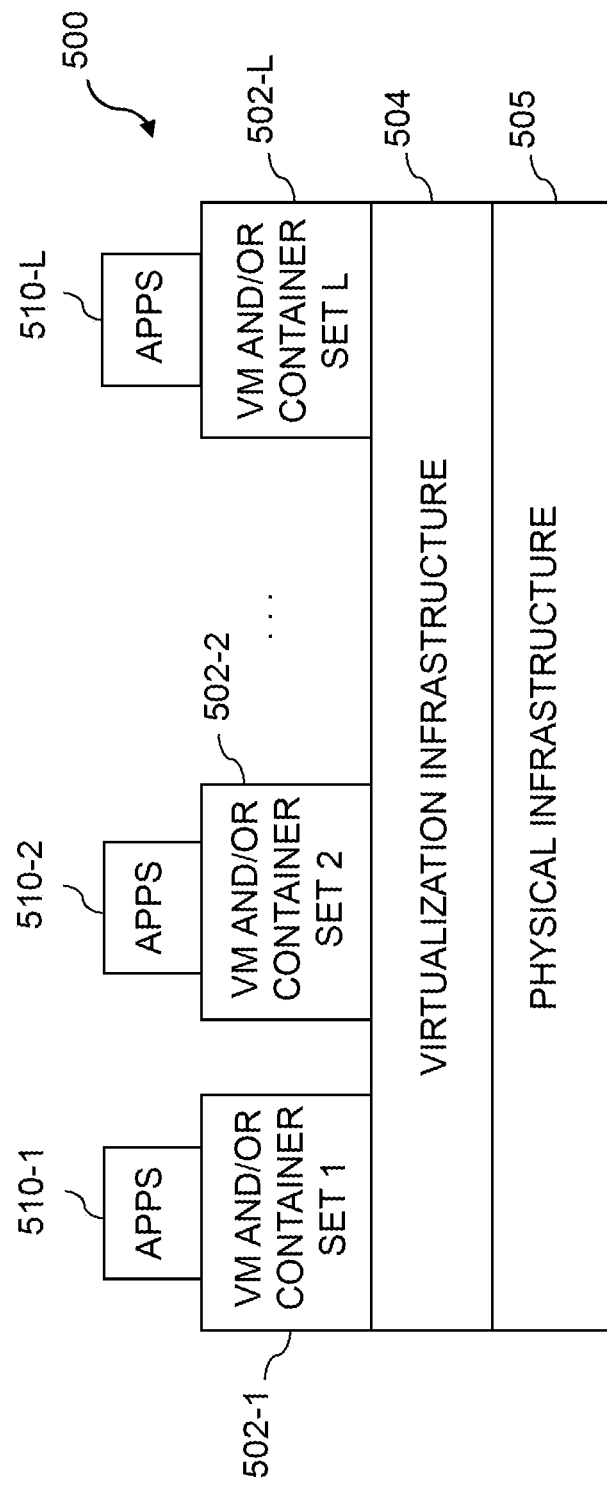
FIGS. 5 and 6 show examples of processing platforms that may be utilized to implement at least a portion of an information processing system in illustrative embodiments.
Figure 6:
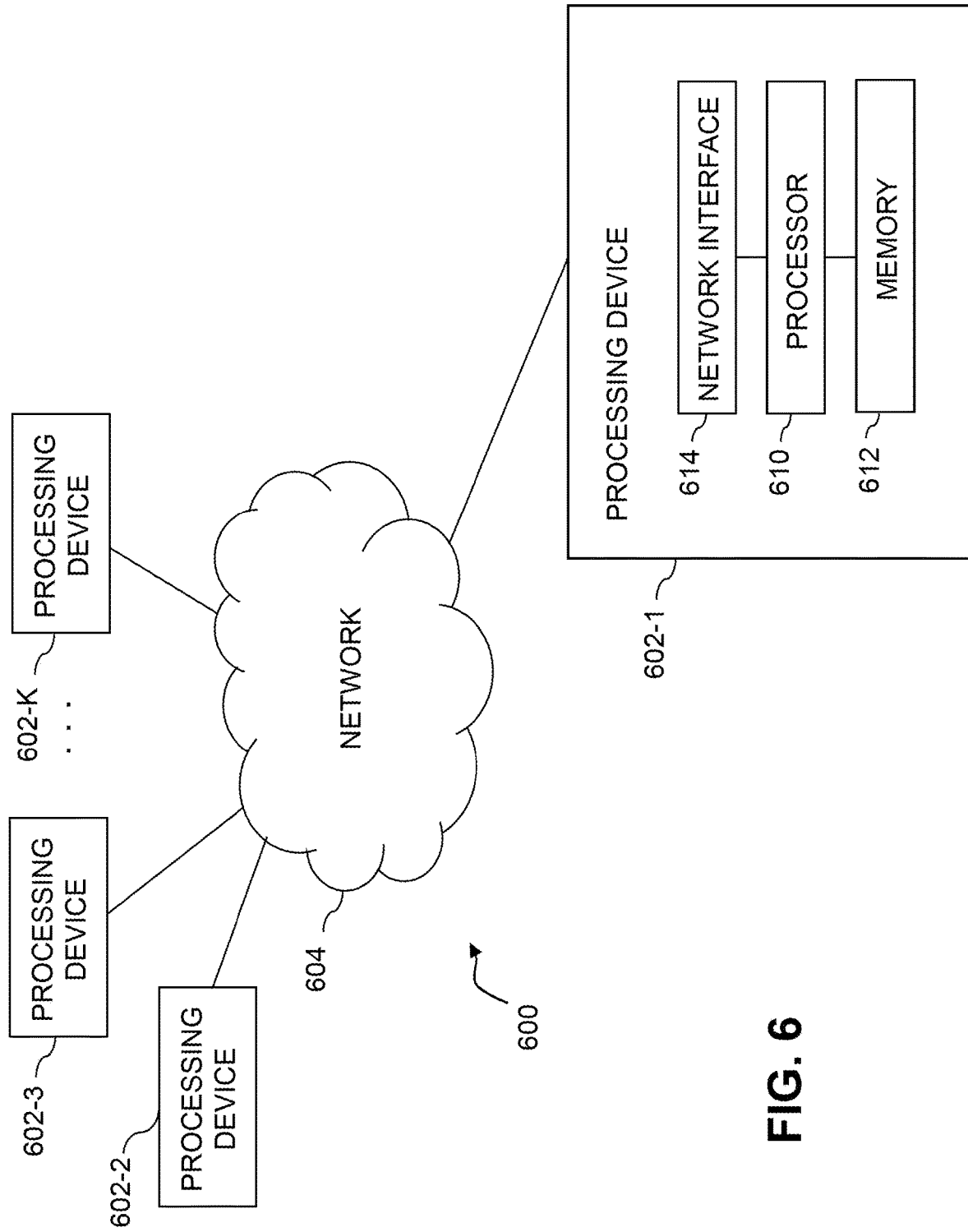

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide deduplication and cryptographic functionalities of the type described above for one or more processes running on a given one of the VMs. For example, each of the VMs can implement deduplication control logic and cryptographic functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide deduplication and cryptographic functionalities of the type described above for one or more processes running on different ones of the containers. For example, a container host device supporting multiple containers of one or more container sets can implement one or more instances of deduplication control logic and cryptographic modules as described herein.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the deduplication and cryptographic functionalities of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, deduplication control logic, encryption modules, decryption modules, and associated control logic and tables. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising deduplication control logic configured to perform one or more deduplication operations on encrypted datasets received from a plurality of tenants and store at least a portion of the encrypted datasets, the datasets having been encrypted for respective ones of the plurality of tenants using a common encryption key shared amongst the respective ones of the plurality of tenants;
a cryptographic module associated with the storage system, the cryptographic module configured to, in response to a request to access an encrypted dataset stored by the storage system corresponding to a given one of the plurality of tenants, further encrypt the encrypted dataset by performing an additional encryption operation on the encrypted data set using a tenant encryption key associated with the given one of the plurality of tenants;
wherein the storage system is further configured to send the further encrypted dataset to the given one of the plurality of tenants that requested access;
wherein the encrypted datasets are encrypted utilizing a first encryption scheme that utilizes a public key of a cryptographic key pair, the public key comprising the common encryption key shared amongst the plurality of tenants;
wherein the further encrypted dataset is encrypted utilizing a second encryption scheme that utilizes a first portion of a private key of the cryptographic key pair, the first portion of the private key of the cryptographic key pair comprising the tenant encryption key associated with the given one of the plurality of tenants;
wherein the further encrypted dataset is decryptable utilizing a second portion of the private key of the cryptographic key pair, the second portion of the private key of the cryptographic key pair comprising a tenant decryption key associated with the given one of the plurality of tenants;
wherein the storage system is non-trusted and is not in possession of the tenant decryption key associated with the given one of the plurality of tenants;
wherein the storage system is configured to obtain a tenant encryption key for each of the plurality of tenants, wherein each tenant encryption key is dedicated to the tenant to which it corresponds; and
wherein the cryptographic module is implemented utilizing at least one processing device comprising a processor coupled to a memory.

2. The apparatus of claim 1, wherein the tenant encryption keys are obtained from a trusted key management entity.

3. The apparatus of claim 1, wherein each tenant encryption key has a corresponding tenant decryption key that serves to decrypt the dataset.

4. The apparatus of claim 1, wherein the common encryption key, each tenant encryption key, and each corresponding tenant decryption key are formed using a Rivest-Shamir-Adleman (RSA) based cryptographic algorithm.

5. The apparatus of claim 1, wherein the plurality of tenants are associated with one or more host devices configured to communicate over a network with the storage system.

6. The apparatus of claim 1, wherein the dataset comprises a set of one or more logical storage volumes of the storage system.

7. The apparatus of claim 1, wherein the public key of the cryptographic key pair is A, wherein the first portion of the private key of the cryptographic key pair for the given tenant is $B_i$, wherein the second portion of the private key of the cryptographic key pair for the given tenant is $C_i$, and wherein $A*B_i*C_i=1$ modulo n.

8. The apparatus of claim 7 wherein n is a multiple of two prime numbers.

9. The apparatus of claim 7, wherein the second encryption scheme comprises returning $Y=X^{B_i}$ modulo n, where X is the encrypted data set and Y is the further encrypted dataset.

10. The apparatus of claim 9, wherein the further encrypted dataset is decrypted according to $M=Y^{C_i}$ modulo n, where M is the decrypted dataset.

11. A method comprising:
performing, in a storage system, one or more deduplication operations on encrypted datasets received from a plurality of tenants in communication with the storage system, the datasets having been encrypted for respective ones of the plurality of tenants using a common encryption key shared amongst the respective ones of the plurality of tenants;
storing at least a portion of the encrypted datasets;
in response to a request to access an encrypted dataset stored by the storage system corresponding to a given one of the plurality of tenants, further encrypting the encrypted dataset by performing an additional encryption operation on the encrypted data set using a tenant encryption key associated with the given one of the plurality of tenants;
sending the further encrypted dataset from the storage system to the given one of the plurality of tenants that requested access; and
obtaining a tenant encryption key for each of the plurality of tenants, wherein each tenant encryption key is dedicated to the tenant to which it corresponds, from a trusted key management entity;
wherein the encrypted datasets are encrypted utilizing a first encryption scheme that utilizes a public key of a cryptographic key pair, the public key comprising the common encryption key shared amongst the plurality of tenants;

wherein the further encrypted dataset is encrypted utilizing a second encryption scheme that utilizes a first portion of a private key of the cryptographic key pair, the first portion of the private key of the cryptographic key pair comprising the tenant encryption key associated with the given one of the plurality of tenants;

wherein the further encrypted dataset is decryptable utilizing a second portion of the private key of the cryptographic key pair, the second portion of the private key of the cryptographic key pair comprising a tenant decryption key associated with the given one of the plurality of tenants;

wherein the storage system is non-trusted and is not in possession of the tenant decryption key associated with the given one of the plurality of tenants; and wherein the method is implemented by at least one processing device comprising a processor coupled to a memory.

12. The method of claim 11, wherein the further encrypting step is performed by a cryptographic module associated with the storage system.

13. The method of claim 11, wherein each tenant encryption key has a corresponding tenant decryption key that serves to decrypt the dataset.

14. A computer program product comprising a non-transitory processor-readable storage medium having stored therein program code of one or more software programs, wherein the program code when executed by the processing device causes the processing device to perform the steps of claim 11.

15. The method of claim 11, wherein the public key of the cryptographic key pair is A, wherein the first portion of the private key of the cryptographic key pair for the given tenant is $B_i$, wherein the second portion of the private key of the cryptographic key pair for the given tenant is $C_i$, and wherein $A*B_i*C_i=1$ modulo n.

16. The method of claim 15, wherein n is a multiple of two prime numbers.

17. A method comprising:

encrypting a dataset associated with a given tenant of a plurality of tenants using an encryption key common to the plurality of tenants;

sending the encrypted dataset to a storage system configured to perform one or more deduplication operations on encrypted datasets received for the plurality of tenants and store at least a portion of the encrypted datasets;

sending a request to access the encrypted dataset stored by the storage system corresponding to the given tenant; and receiving a further encrypted dataset from the storage system, the further encrypted dataset having been further encrypted by the storage system by performing an additional encryption operation on the encrypted data set using a tenant encryption key dedicated to the given tenant;

wherein the encrypted dataset is encrypted utilizing a first encryption scheme that utilizes a public key of a cryptographic key pair, the public key comprising the common encryption key shared amongst the plurality of tenants;

wherein the further encrypted dataset is encrypted utilizing a second encryption scheme that utilizes a first portion of a private key of the cryptographic key pair, the first portion of the private key of the cryptographic key pair comprising the tenant encryption key associated with the given tenant wherein the further encrypted dataset is decryptable utilizing a second portion of the private key of the cryptographic key pair, the second portion of the private key of the cryptographic key pair comprising a tenant decryption key associated with the given tenant;

wherein the storage system is non-trusted and is not in possession of the tenant decryption key associated with the given one of the plurality of tenants; and wherein the method is implemented by at least one processing device comprising a processor coupled to a memory.

18. The method of claim 17, further comprising:

decrypting the further encrypted dataset using the tenant decryption key associated with the given tenant to obtain the dataset.

19. The method of claim 17, wherein the plurality of tenants is associated with one or more host devices configured to communicate over a network with the storage system.

20. The method of claim 17, wherein the public key of the cryptographic key pair is A, wherein the first portion of the private key of the cryptographic key pair for the given tenant is $B_i$, wherein the second portion of the private key of the cryptographic key pair for the given tenant is $C_i$, and wherein $A*B_i*C_i=1$ modulo n.

* * * * *